Nov. 10, 1970    L. B. JOHNSTON    3,538,623
INSTRUCTIONAL DEVICE

Filed May 8, 1968    3 Sheets-Sheet 1

INVENTOR.
LOWELL B. JOHNSTON
BY
*Townsend & Townsend*
ATTORNEYS

INVENTOR.
LOWELL B. JOHNSTON
BY Townsend and Townsend
ATTORNEYS

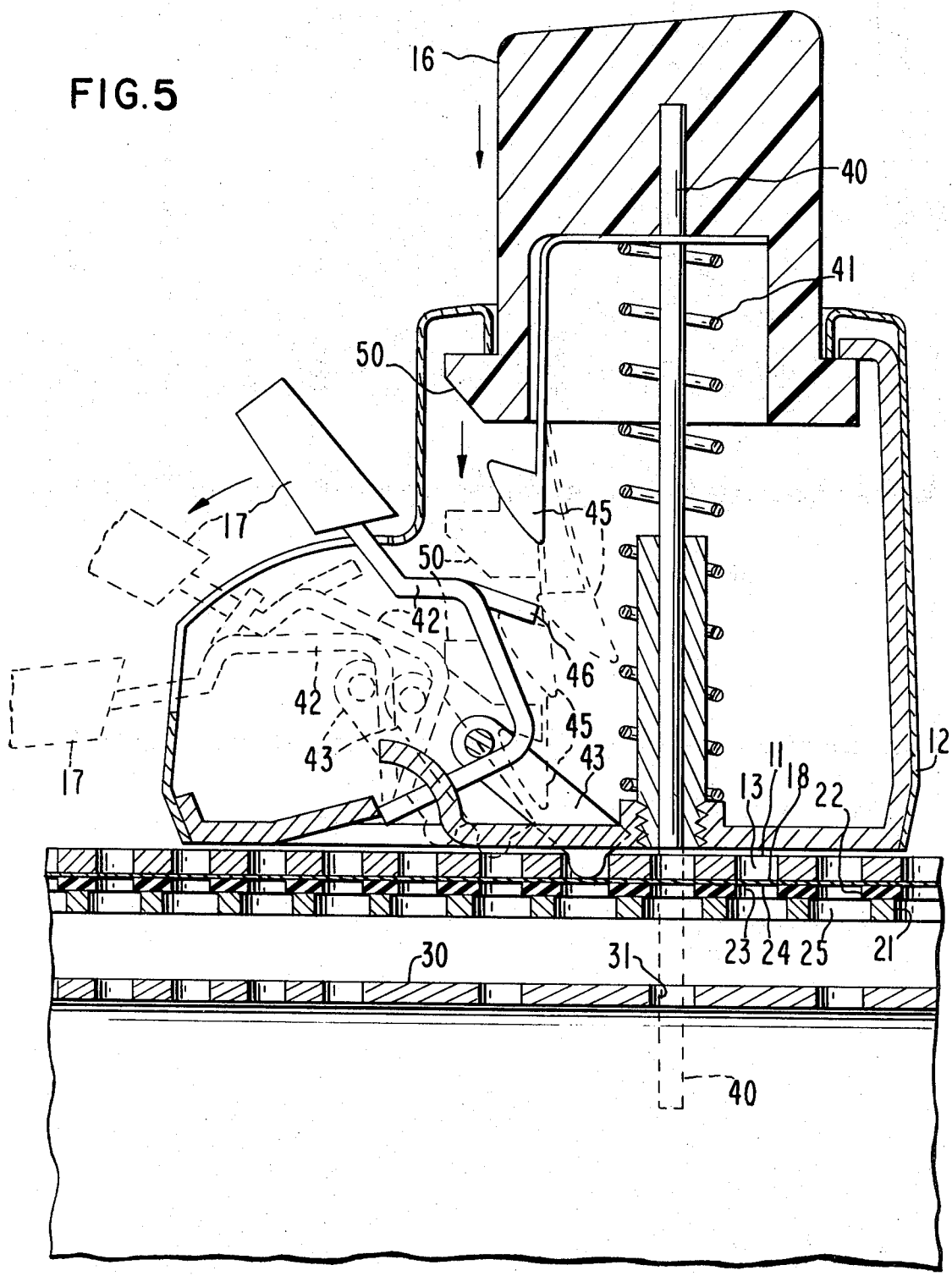

United States Patent Office 3,538,623
Patented Nov. 10, 1970

3,538,623
INSTRUCTIONAL DEVICE
Lowell B. Johnston, Daly City, Calif., assignor to
Dymedia Incorporated, Palo Alto, Calif.
Filed May 8, 1968, Ser. No. 727,637
Int. Cl. G09b 3/06
U.S. Cl. 35—9                                      16 Claims

ABSTRACT OF THE DISCLOSURE

An instructional device to facilitate adjunct auto-instruction is disclosed wherein there is provided an elongated base having rows of holes therein and a movable carriage adapted to slide along the base over the rows of holes. The carriage includes a row of keys and punches for registering the answers to multiple choice questions on a punch card positioned on the opposite side of the elongated base. Means are provided to shift the carriage from a first row of holes corresponding to a first question to a second row of holes corresponding to a second question, only after the correct answer to the first question has been selected by depressing the appropriate key punch.

---

This invention relates to a new and improved instructional device useful for implementing an individualized method of learning known as adjunct auto-instruction. To this end, the device may be used for self-instructional testing and, in addition, may be used for evaluative testing.

Adjunct auto-instruction is a method of guiding and reinforcing individualized learning by the systematic and frequent use of self-scoring multiple choice tests in conjunction with all forms of conventional instructional material. In particular, according to the present invention, the student administers to himself a series of multiple choice questions designed to bring out important or difficult points after receiving instruction by conventional means as by lecture, film, discussion, or text. If the answer to a multiple choice question is correct, the instructional device automatically informs the student and moves on to permit the next question to be answered. If the student selects an incorrect answer, the instructional device remains in position and the student must restudy and rethink his answer and find the correct answer before the instructional device moves on to permit a subsequent question to be answered. The student thus records his responses to the test questions and the device provides immediate feedback to the student of whether his answer is right or wrong. Furthermore, the device restricts the student to answering the present question until it is answered correctly before subsequent questions may be answered. The responses to the test questions are recorded on a standard punch card thereby providing a record for data processing. The student undergoes an individualized learning experience while being informed of the portions of the instructional material which he should review. The student may thus proceed at his own pace.

The punch card recrods of responses to test questions may be automatically scored by a simple data processing machine. Furthermore, a collection of punch card records provide means for automatic statistical analysis and processing of test data. Available data processing machines may be used for automatically analyzing the performance of particular students or the effectiveness of particular questions, or the performance of entire classes, schools and school systems. The resulting data may be used as a guide for selecting materials, curricula, and for measuring improvements.

A feature and advantage of adjunct auto-instruction as implemented by the present invention is that specialized instructional teaching material, such as programmed texts for direct instruction of the student as required in the instructional technique known as programmed instruction, are not required. Such specialized programmed instructional texts and materials are expensive, impersonal, inflexible and often negatively received by teachers. On the other hand, adjunct auto-instruction as implemented by the present invention is a self-instructional testing technique which is used as an adjunct to conventional instructional methods. Rather than displacing the teacher, it relieves the teacher of the tedious aspects of his profession by providing student self-administered individualized testing and automated test scoring, leaving the teacher to concentrate on his more personal style of teaching.

Another feature and advantage of the present invention is that the instructional device for implementing adjunct auto-instruction is a single self-contained durable piece of equipment for use by individual students which does not lend itself to mischievous use by either students or teachers.

In order to accomplish these results and implement the adjunct auto-instruction learning method, the present invention contemplates providing an elongated base having a plurality of holes therethrough arranged in transverse rows across the base and longitudinal columns along the base. A carriage is movably mounted on the base adapted to selectively slide along the longitudinal direction of the base and includes a plurality of keys arranged in a row on the carriage transversely across the base, each key depressably mounted on a punch rod on the carriage so that each punch rod may be depressed through a hole in each transverse row of holes in the base. Punch rod receiving means are positioned beneath the base on the side opposite the carriage adapted to receive a punch rod extending through at least one of the holes in each transverse row of holes on the base. The carriage is further provided with stop means to retain the carriage in a position over the base with the keys and rods lined over a transverse row of holes in the base. Means are provided to release the stop means and advance the carriage to the next transverse row of holes in the base only upon depression of a key and associated punch rod through a hole in the base and into the punch rod receiving means.

The punch rod receiving means may be adapted to receive a punch rod extending through only one hole in a particular transverse row of holes corresponding to the correct answer for a particular question. The carriage is released and advanced to the next adjacent transverse row of holes corresponding to the next question, only upon depression of the appropriate key and associated punch rod into the punch rod receiving means corresponding to the correct answer of previous question. The punch rod corresponding to an incorrect answer will not enter the punch rod receiving means to release and shift the carriage to the next question. The carriage remains in place. Feedback is thus provided for the student so that the self-administered test provides a learning experience.

Alternatively, the instructional device may be used for evaluative testing of the conventional type where no feedback is provided for the student. In that event, the punch rod receiving means is adapted to receive a punch rod extending through any of the holes in a particular transverse row of holes corresponding to a particular question to thereby advance the carriage to the next transverse row of holes corresponding to the next question when the student has responded to the question without informing the student of the correctness of his answer.

According to a preferred embodiment of the invention, the punch rod receiving means comprises a plurality of elongated tubes positioned beneath the base, one corresponding to each hole in a row of holes in the base corresponding to possible responses to a question. The tubes are provided with a predetermined configuration of holes therein adapted to selectively receive punch rods corresponding to correct answers only. The tubes may be rotated to provide different correct answer sequences for different exams. In one angular orientation the tubes will receive any of the key punches thereby permitting the device to be used for evaluative testing.

In each case a punch card is interposed between the elongated base and the punch rod receiving means to provide a permanent record of the student's responses to the multiple choice questions. The punch rod receiving means is adjustable to provide a large variety of combinations of correct answer sequences for different tests so that the correct answer pattern may be continually varied.

Other objects, features and advantages of the present invention will become apparent in the following specification and accompanying drawings.

In the drawings:

FIG. 5 is a detailed cross-sectional view of the slidable carriage mounted on the elongated base.

Figure 1:
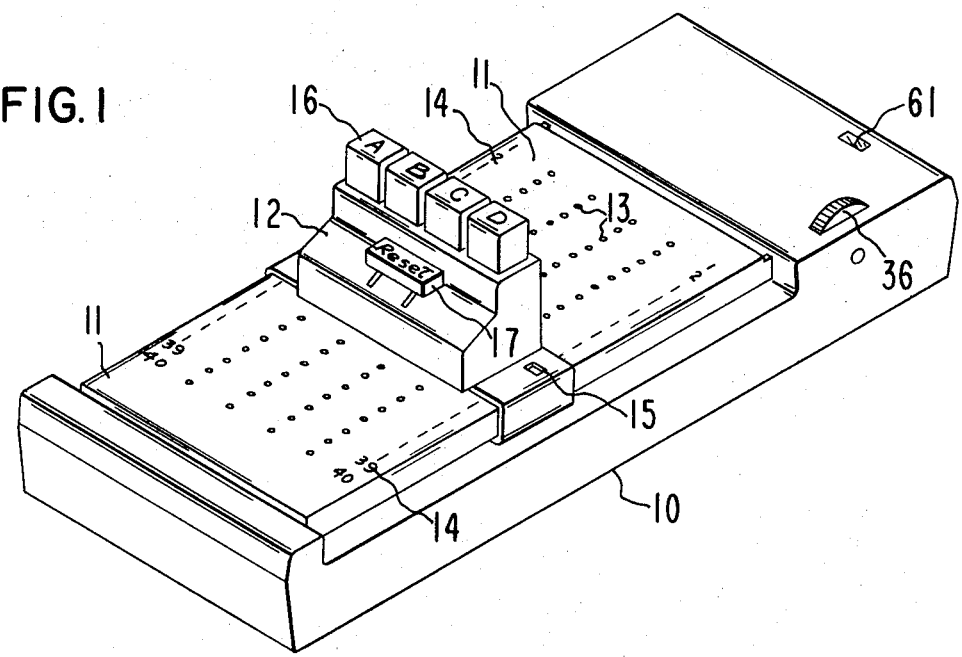
FIG. 1 is a perspective view of an instructional device embodying the present invention.

In the embodiment of the present invention illustrated in FIG. 1 there is generally provided a housing 10 supporting an elongated base 11 having mounted thereon a slidable carriage 12 slidable along the longitudinal direction of the elongated base 11. The base 11 has formed therein a plurality of holes 13 formed into a column of transverse rows, each transverse row numbered by indicia 14 along the sides of the base 11. The carriage 12 is adapted to slide along the base 11 successively stopping over each transverse row of holes, the particular transverse row of holes over which the carriage is stopped being indicated by the indicia 14 appearing through the window 15 in the carriage 12. The carriage is provided with a row of keys 16 mounted thereon in a row transversely across the base 11. One key 16 is provided for each hole in a transverse row of holes and each key is mounted on a punch rod adapted to extend through a hole 13 upon depression of the corresponding key 16. Because under certain circumstances as hereinafter described the keys remain down when depressed, a reset button 17 is provided to reset the keys to their original position and reset the position of the carriage.

Figure 2:
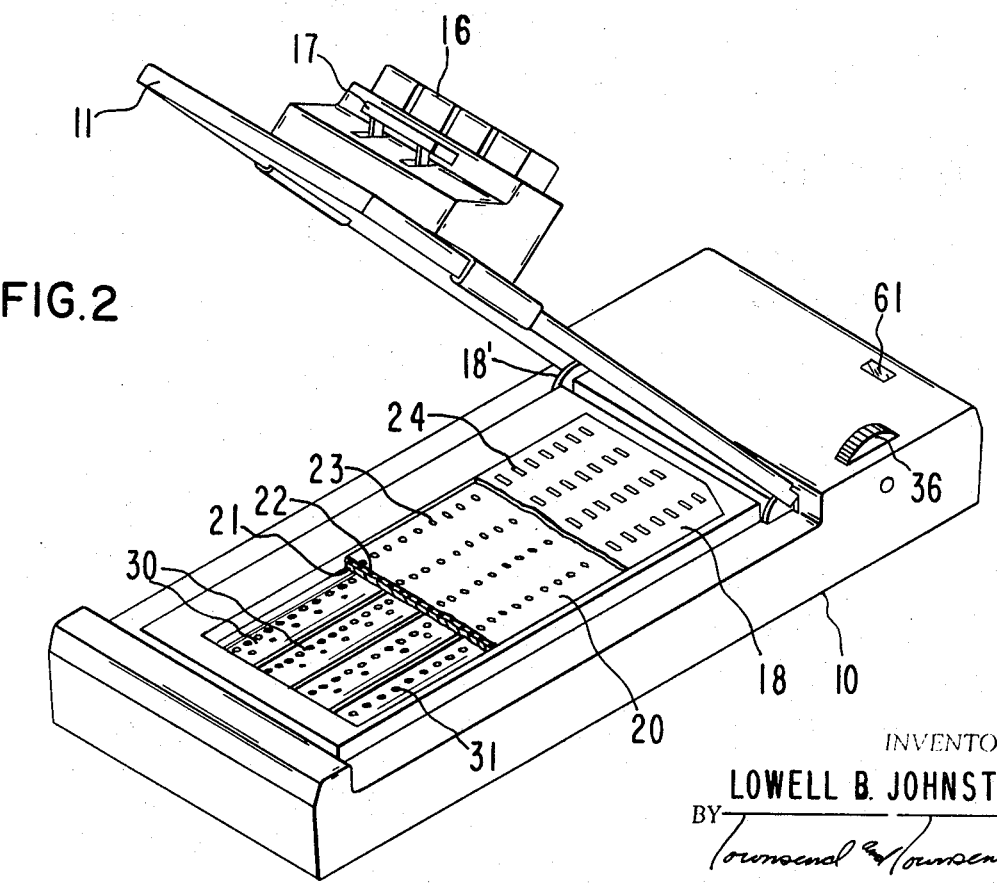
FIG. 2 is a partially exploded perspective view of the instructional device illustrated in FIG. 1.

As illustrated in FIG. 2, the elongated base 11 is pivotally mounted on a hinge 18' near one end of the housing. Positioned within the housing 10 immediately beneath the hinged base 11 a punch card 18 is positioned for recording responses to test questions. The punch card 18 is supported by a punch plate 20 on which the punch card is positioned. The punch plate 20 as shown in FIG. 2 includes a metal support plate 21 over which is adhered a resilient sheet 22. The resilient sheet 22 is formed with a plurality of transverse rows of holes corresponding to transverse rows of pre-scored chips on the punch card which in turn correspond to the transverse rows of holes in the elongated base 11. The holes 23 in the resilient sheet 22 are adapted to receive prescored chips 24 in the punch card 18 which are punched through the hole 23 by a key 16 and its associated punch rod. The metal support plate 21 includes a hole in alignment with each of the holes 23 in the resilient sheet to permit ready passage of a chip punched from the card. The openings 23 formed in the resilient sheet are generally in the form of slits or cross-slits to permit one-way passage of scored chips from the card 18 therethrough under the impetus of a punch rod and to retain the chips thereunder upon removal of the punch rod. The dimensions of the housing 10 and components are such that the transverse rows of holes 13 in base 11, the transverse rows of scored chips 24 in card 18, the transverse rows of openings 23 in resilient sheet 20 and the openings in metal support sheet 21 are in alignment when the punch plate and card are positioned in the housing and the base 11 closed on its hinges as illustrated in FIG. 5.

Figure 3:
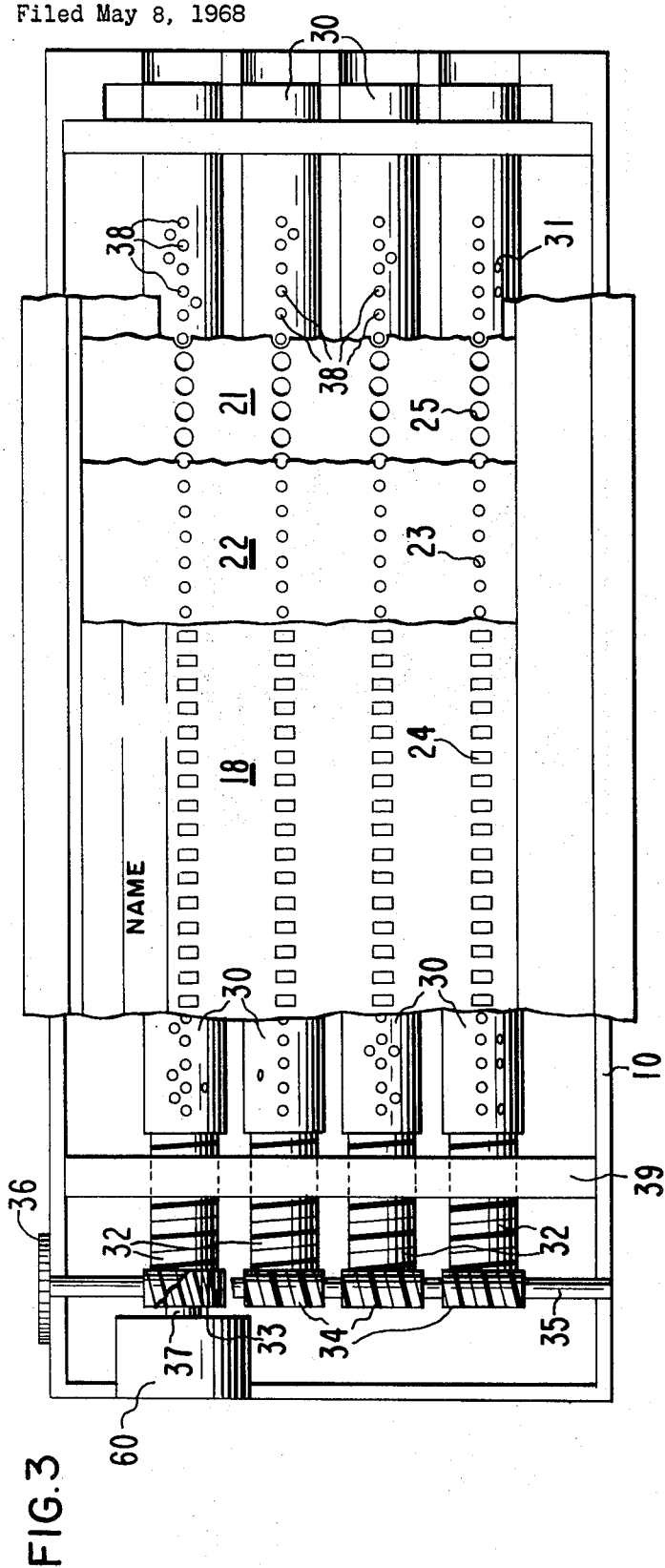
FIG. 3 is a fragmentary plan view from above in partial cross-section of the instructional device.
Figure 4:
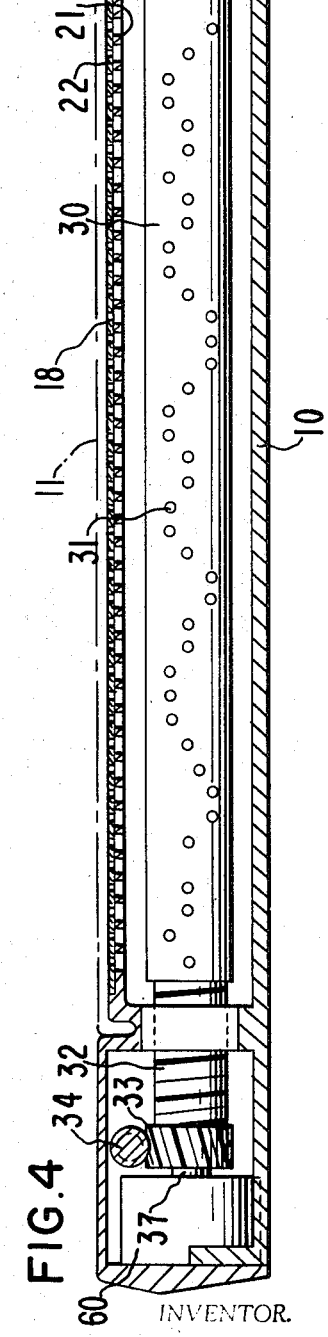
FIG. 4 is a cross-sectional side view of the instructional device.

Referring to FIGS. 2 through 4, mounted within the housing 10 and spaced beneath the punch plate 20 are punch rod receiving means comprising a plurality of elongated tubes 30, each tube having a plurality of holes 31 formed therein according to a predetermined configuration, one elongated tube provided corresponding to each hole in a transverse row of holes in the base 11. Each elongated tube 30 is mounted for rotation about a longitudinal axis terminating at one end in a co-axial threaded screw 32 and a wheel gear 33. Positioned transversely across the tubes at the end of the tubes terminating in wheel gears 33 are a plurality of worm gears 34 coaxially mounted on a rod 35, in turn rotatably mounted with a knurled knob 36 at one end of the rod for rotating the worm gears 34. The worm gears 34 engage the wheel gears 33 at the end of each screen 32 to rotate the rods about axes 37 as the knurled knob 36 is rotated.

As heretofore mentioned, each elongated tube is formed with a plurality of holes 31 formed therein according to a predetermined configuration. The configuration of holes 31 is such that at every angular orientation except one of the tubes 30 with respect to the base 11, only one of the tubes includes a hole 31 in alignment with a hole in any one transverse row of holes in the base 11. Thus, only one of the punch rods 40 attached to the keys 16 on carriage 12 as illustrated in FIG. 5 will penetrate through a hole 31 in one of the tubes 30 for any particular transverse row of holes in the base 11 thereby indicating a correct answer to the student as hereinafter described. In one angular orientation of the tubes 30 with respect to the base 11, as illustrated in FIG. 3, however, each of the tubes 30 includes a linear column of holes 38 centrally of the tube in alignment with the holes in the base 11 so that any of the punch rods 40 attached to the keys 16 will penetrate a hole 38 in one of the tubes upon depression of any of the keys 16.

Each tube 30 may be formed from a flat sheet of metal which is prepunched with the predetermined configuration of holes therethrough. The flat sheet of metal is then rolled and formed into the tube to be mounted in the housing 10. Because of the variety of permutations of hole combinations between the four tubes, a large variety of correct answer hole combinations may be provided. To further increase the variety of possible correct answer hole configurations for different tests, the threaded end 32 of each tube 30 engages a bridge 39 across the housing so that as the tubes 30 rotate, there is a slight predetermined amount of longiutdinal translation to thereby bring new combinations of holes into position beneath the base 11. Since the tubes 30 are synchronized, one of the tubes may be provided with a roller 60 with indicia printed thereon to indicate the configuration of correct answer hole combinations in position beneath the base 11. The appropriate indicia on the roller 60 may be viewed through a window 61 in the housing 10 as indicated in FIGS. 1 and 2.

Referring more particularly to the carriage mechanism 12 illustrated in FIG. 5, each key 16 on the row of keys across the carriage is mounted on a punch rod 40 and spring-biased in an upward direction by spring 41 coaxially enclosing the punch rod 40 and extending between the key 16 and the bottom of the carriage 12. Mounted within the carriage 12 there is also a rocker mechanism 42 biased in a forward position by a bent wire spring. Pivotally mounted on the rocker is a depending pawl 43 including a projection adapted to extend within and engage a hole 13 in the base 11 to rigidly maintain the carriage in a fixed position on the base 11 when the rocker 42, biased by the bent wire spring, is in its forward position. With the rocker 42 in its forward position and the depending pawl 43 engaging a hole 13 in the base 11, the punch rods 40 are in alignment over a transverse row of holes in the base 11. Thus, upon depression of a key 16, the corresponding rod 40 will extend through a hole 13 in the row of holes in base 11 over which the punch rod is aligned, and punch out a scored chip 24 from the punch card 18 through the punch plate 20 comprising the resilient layer 22 and support plate 21. The scored chip will thereafter be retained beneath the support plate 21 in that portion of the housing containing the tubes 30. If the punch rod 40 is also in alignment with a hole 31 in a punch rod 40 receiving tube 30, the punch rod 40 upon further depression of key 16 will penetrate the hole 31 into the tube 30. However, if a hole 31 in a tube 30 is not in alignment with the punch rod 40, the punch rod will be stopped at the surface of the tube 30 and penetrate no further.

Upon depression of the key 16, a depending hook 45 engages a lug 46 extending from the rocker 42 to thereby maintain the key in a depressed position. If the punch rod 40 is stopped at the surface of a tube 30, there being no hole 31 in alignment with the punch rod 40, the hook 45 will engage the lug 46 on the rocker 42 and maintain the key 16 in a depressed position, thereby indicating to the student that the answer corresponding to the key depressed is incorrect and has been attempted as a response. If the chosen answer is correct, a hole 31 in a tube 30 beneath the punch rod 40 will be in alignment with the punch rod which penetrates the tube 30 so that the key 16 may be depressed downward to a lower position. As the key 16 is depressed to a lower position, a camming surface extension 50 on the key 16 engages the rocker 42 pushing the rocker back against its biasing spring thereby lifting the depending pawl 43 from its stop position in a hole 13 of the base 11, and also releasing the hook 45 on the key 16 from the lug 46 on the rocker 42. When the key 16, depressed to its lowest position is released, the pawl 43 engages a hole 13 in the next adjacent transverse row of holes in base 11 as the rocker 42 returns to its forward position. When the punch rod 40 has been withdrawn from the base 11, the carrier 12 slides along the base 11 as the spring-biased rocker returns to its forward position pushing against the depending pawl 43 which has engaged a hole 13 in the next row of holes in the base 11. The key 16 and punch rods 40 are then fixed in position in alignment over the next transverse row of holes in base 11 corresponding to the next question, all the keys having returned to an upward position.

When the instructional device is being used as a self-instructional testing device to provide a learning experience with feedback to the student as to the correctness of his responses, the elongated punch rod receiving tubes 30 are oriented with respect to the base 11 so that only one of the tubes 30 has a hole 31 in alignment with a punch rod 40 for each transverse row of holes in the base 11. With the tube so oriented, only the key 16 corresponding to the correct answer to a particular question indicated by the number in window 15 can be depressed to its lowest position with the punch rod attached to the key extending into a tube 30 through a hole 31 in the tube. In that event the carriage 12 is advanced to the next row of holes corresponding to the next question as heretofore described. If the student selects an incorrect answer the key is depressed until the punch rod 40 is stopped at the surface of a tube 30 and the hook 45 on the key 16 engages a lug 46 on the rocker 42 thereby retaining the key in a depressed position indicating to the student that the response is incorrect. The student must then restudy and rethink the question and select another response. When the correct response is chosen, the key 16 is depressed to its lowest state thereby releasing the other keys and permitting advance of the carriage 12 to the next row of holes corresponding to the next question. The punch card 18 in which the responses of the student are stored may then be automatically scored by a photoelectric card sensing device in which single punches indicate a correct response and multiple punches in any one row indicate an incorrect response. Collections of punch cards may further be processed by other data processing machines for statistical analysis of students, questions, classes, schools and entire school systems.

When used as an evaluative testing device without feedback to the student, the punch rod receiving tubes 30 are oriented with respect to the base 11 as indicated in FIG. 3 with the linear columns of holes 38 centered in the upward direction. With this configuration of holes in the tubes 30, any one of the keys 16 and punch rods 40 may be depressed to the lowest position with the punch rod penetrating into the tube 30 thereby advancing the carriage 12 to the next transverse row of holes in the base 11. Testing may then be accomplished according to the conventional method wherein the student is not informed as to his progress during the test. For automatic scoring of the responses of the student scored in the punch card 18, the punch card is prepunched with the correct answers so that correct responses by the student correspond to a single hole in a transverse row while multiple holes again correspond to an incorrect response. Data processing machinery may then be used to automatically score the cards and provide statistical analyses of collections of cards.

While the instructional device is being used as an evaluative testing device, the carriage 12 advances to the next question after a response by the student to the previous question whether or not his answer is correct, while, when the instructional device is being used as a self-instructional learning test, the carriage 12 advances to the next row of holes corresponding to the next question only after a correct response by the student thereby providing feedback and a reinforcing learning experience to the student. In either case, however, whether or not the student is correct, a hole will be punched in the punch card recording the student's responses to the various questions, thereby permitting automated scoring.

The instructional device may thereby be used in conjunction with conventional teaching materials and the tests adapted for use with the materials.

While only one embodiment of the invention has been shown and described other adaptations and modifications would be apparent without departing from the true spirit and scope of the following claims.

What is claimed is:

1. An instructional device comprising: an elongated base having a plurality of holes therethrough arranged in a column of transverse rows across the base; a carriage movably mounted on the base adapted to selectively slide along the longitudinal direction of the base, said carriage comprising a plurality of keys arranged in a row on the carriage transversely across the base, a plurality of punch rods mounted on the carriage and each said punch rod connected to one of said keys, each said punch rod adapted to be depressed through a hole of each transverse row of holes in the base; punch rod receiving means spaced from said base on the side opposite said carriage adapted to receive a punch rod extending through at least one of the holes in each transverse row of holes in said base; said carriage including stop means to retain said carriage in a position over the base with the keys and rods aligned over a transverse row of holes in said base and means to release said stop means and advance said carriage to the next transverse row of holes in the base only upon depression of a key and associated punch rod through a hole in the base and into said punch rod receiving means.

2. An instructional device as set forth in claim 1 wherein a punch card is interposed between the base and the punch rod receiving means.

3. An instructional device as set forth in claim 1 wherein said punch rod receiving means comprises a plurality of elongated cylinders, one cylinder spaced beneath and in alignment with one hole in each transverse row of holes in the base, each said cylinder having a plurality of holes therein adapted to receive a punch rod, said holes arranged according to a predetermined configuration.

4. An instructional device as set forth in claim 1 wherein said stop means comprises at least one depending pawl, spring biased to engage a hole in the base.

5. An instructional device as set forth in claim 4 wherein said carriage has a spring biased rocker thereon, said pawl depending from said rocker and wherein each said key has a camming means thereon adapted to move said rocker upon depression of the key and associated punch rod through a hole in the base and into said punch rod receiving means.

6. An instructional device as set forth in claim 5 wherein said rocker means is moved a predetermined amount by said camming means upon depression of a key and associated punch rod into the punch rod receiving means to thereby disengage said depending pawl from a first hole in a transverse row of holes in the base and engage said pawl in a second hole in the next transverse row of holes whereby said carriage is advanced from a position over one transverse row of holes to a position over the next transverse row of holes upon release of the key and associated punch rod and return of the rocker to its original position.

7. An instructional device as set forth in claim 5 wherein each said key includes a hook means adapted to engage the rocker upon depression of the key and associated punch rod through a hole in the base and wherein said hook means is disengaged upon further depression of the key and associated punch rod into the punch rod receiving means, and movement of the rocker by said camming means.

8. An instructional device as set forth in claim 1 wherein said punch rod receiving means includes a portion movable to a different position with respect to said base and having holes at predetermined locations such that said portion is adapted to receive a punch rod protruding through only one predetermined hole in each transverse row of holes in said base for different positions of said portion.

9. An instructional device as set forth in claim 8 wherein said movable portion is movable to a position having holes in predetermined locations to receive punch rods protruding through any of the holes in each transverse row of holes in said base.

10. An instructional device as set forth in claim 9 wherein a prepunched card having a predetermined sequence of holes punched therein is interposed between the base and punch rod receiving means.

11. An instructional device as set forth in claim 1 wherein a punch card is interposed between the elongated base and the punch rod receiving means and wherein a punch plate is positioned adjacent and beneath the punch card, said punch plate comprising a plate and resilient sheet adhered thereto, said punch plate having openings formed therein in alignment with the holes in the elongated base.

12. An instructional device as set forth in claim 1 wherein said punch rod receiving means comprises a plurality of elongated cylinders having holes formed therearound according to predetermined configurations, said cylinders being mounted for axial rotation together.

13. An instructional device comprising: a base member having a plurality of holes therethrough in a column of transverse rows; a carriage movably mounted on said base, a plurality of keys mounted on said carriage, a plurality of punch rods mounted on said carriage, each of said punch rods connected to at least one of said keys and adapted for movement through one hole of each transverse row of holes in response to movement of one of said keys; punch rod receiving means positioned on the opposite side of said base from said carriage; means for moving said carriage between adjacent transverse rows of holes in said base when one of said punch rods is received by said punch rod receiving means.

14. The device in accordance with claim 1 wherein said punch rod receiving means includes a portion movable with respect to said base and having punch rod receiving apertures at predetermined locations such that said movable portion can be moved to a plurailty of positions each adapted to receive a punch rod protruding through only one predetermined hole in each transverse row of holes in said base.

15. An instructional device as set forth in claim 14 wherein said movable portion is movable to a position having holes in one predetermined location to receive a punch rod protruding through any of the holes in each transverse row of holes in said base.

16. The device in accordance with claim 14 wherein said punch rod receiving means comprises a plurality of elongated cylinders, one for each hole in a transverse row of holes, the cylinders being axially rotatable in unison and having a plurality of punch rod receiving apertures therein.

References Cited

UNITED STATES PATENTS

| | | | |
|---|---|---|---|
| 2,213,974 | 9/1940 | Baker | 35—48 |
| 2,690,621 | 10/1954 | Dean | 35—9 |
| 3,116,565 | 1/1964 | Havlicek | 35—48 |
| 3,280,482 | 10/1966 | Johnson | 35—48 |

WILLIAM H. GRIEB, Primary Examiner

U.S. Cl. X.R.

35—48